(12) United States Patent
Ohtsuka et al.

(10) Patent No.: US 6,828,058 B2
(45) Date of Patent: Dec. 7, 2004

(54) BATTERY CONNECTING PORTION-PROTECTING COVER

(75) Inventors: Haruhito Ohtsuka, Shizuoka (JP); Norio Matsumura, Shizuoka (JP); Tomoaki Kajii, Kanagawa (JP); Hiroshi Nakadouzono, Kanagawa (JP); Yoshinori Atago, Kanagawa (JP)

(73) Assignee: Yazaki Corporation, Tokyo (JP)

( * ) Notice: Subject to any disclaimer, the term of this patent is extended or adjusted under 35 U.S.C. 154(b) by 231 days.

(21) Appl. No.: 10/133,639

(22) Filed: Apr. 29, 2002

(65) Prior Publication Data

US 2002/0168566 A1 Nov. 14, 2002

(30) Foreign Application Priority Data

May 1, 2001 (JP) .................................... P2001-134491

(51) Int. Cl.⁷ ................................................ H01M 2/00
(52) U.S. Cl. ........................ 429/65; 429/121; 439/522
(58) Field of Search ..................... 429/65, 121; 439/522

(56) References Cited

U.S. PATENT DOCUMENTS

| | | | | |
|---|---|---|---|---|
| 4,562,125 A | * | 12/1985 | Davis | 429/65 |
| 4,574,285 A | | 3/1986 | Bascou | |
| 4,698,459 A | * | 10/1987 | Drake | 429/65 X |
| 5,169,338 A | * | 12/1992 | Dewar et al. | 439/522 |
| 5,503,642 A | * | 4/1996 | Lippert et al. | 429/65 X |
| 5,815,886 A | | 10/1998 | Nishio et al. | |
| 5,897,392 A | * | 4/1999 | Takahashi et al. | 429/121 X |
| 5,910,029 A | | 6/1999 | Siedlik et al. | |
| 6,576,838 B2 | * | 6/2003 | Matsumura | 439/522 X |

FOREIGN PATENT DOCUMENTS

| | | | |
|---|---|---|---|
| EP | 1 047 245 A2 | 10/2000 | |
| EP | 1 056 157 A2 | 11/2000 | |
| FR | 2601515 | * 1/1988 | ............ H01M/2/30 |
| JP | 2000-340214 | 12/2000 | |

OTHER PUBLICATIONS

Japanese Abstract No. 2000196257, dated Jul. 14, 2000.

* cited by examiner

*Primary Examiner*—Stephen J. Kalafut
(74) *Attorney, Agent, or Firm*—Sughrue Mion, PLLC

(57) ABSTRACT

Insertion piece portions 25, each having a retaining portion 25a formed at a distal end thereof, is formed on that portion of a cover opening/closing portion 17 disposed near to a hinge portion 17. A cover body portion 11 has insertion hole portions 26 into which the insertion piece portions 25 can be fittingly inserted, respectively. The cover opening/closing portion 17 and the cover body portion 11 include slanting walls 22 and 16, respectively, which are opposed to each other, with the hinge portion 27 disposed therebetween, and the insertion piece portions 25 are formed on the slanting wall 22 of the cover opening/closing portion 17, and the insertion hole portions 26 are formed in the slanting wall 16 of the cover body portion 11. The pair of insertion piece portions 25 are provided, and the retaining portions 25a of the pair of insertion piece portions 25 project inwardly toward each other or outwardly away from each other. With this construction, the insertion piece portions 25 of the cover opening/closing portion 17 are inserted respectively into the insertion hole portions in the cover body portion 11, and the retaining portions 25a of the cover opening/closing portion 17 are retained by the insertion hole portions 26, respectively, so that the cover opening/closing portion 17 is held in the open condition.

24 Claims, 9 Drawing Sheets

Prior Art

BATTERY CONNECTING PORTION-PROTECTING COVER

BACKGROUND OF THE INVNETION

1. Field of the Invention

This invention relates to a battery connecting portion-protecting cover which is used for a battery terminal or a fuse unit, connected to a battery post mounted on a vehicle, for the purpose of preventing the short-circuiting, developing upon contact with an external object, and the corrosion due to the intrusion of waterdrops.

2. Related Art

An on-vehicle battery includes a pair of battery posts made of a lead alloy. A battery terminal for supplying electric power from the battery to an auxiliary equipment or the like, a fuse unit, or others is connected to the battery post. The battery terminal or the fuse unit is protected by a protecting cover in an insulated manner for the purpose of preventing the short-circuiting, developing upon contact with an external object, and the corrosion due to the intrusion of waterdrops.

In view of the need for attachment/detachment of the battery terminal during the assembly of the vehicle and the need for exchange and visual inspection of fuses, the protecting cover is separate from the battery terminal and the fuse unit, and can be opened and closed, and is detachably mounted on the battery terminal or the fuse unit by suitable engagement means.

FIGS. 8 and 9 show one conventional protecting cover disclosed in JP-A-2000-340214. This illustrated protecting cover 101 is used for a battery terminal 102 (FIG. 10), and is mounted on the battery terminal in such a manner that this protecting cover can be pivotally opened and closed about a hinge portion 107.

The battery terminal 102, shown in FIG. 10, is made of electrically-conductive metal, and includes a wire connection portion 102a for being press-fastened to that portion of a conductor 104, exposed by removing a sheath of a wire 103 at a distal end portion thereof, and a clamp portion 102b for connection to a battery post (not shown). This clamp portion 102b includes a fastening ring 105 of a generally short cylindrical shape for being fastened to the battery post. A pair of extension piece portions 105a project forwardly from the fastening ring 105, and a fastening bolt 106 is mounted on distal ends of these extension piece portions. The fastening ring 105 can be decreased in diameter by tightening the fastening bolt 106, and by doing so, the battery terminal 102 can be fastened to the battery post.

As shown in FIG. 8, the protecting cover 10 is molded entirely of a synthetic resin, and has an integral construction, and this protecting cover includes a cover body 101a for holding the wire connecting portion 102a and the fastening ring 105 in a generally embracing manner, and a cover piece portion 101b which is connected to the cover body 101a through the hinge portion 107 so as to cover the upper side and opposite sides of the clamp portion 102b.

The cover body 110a has a generally U-shaped cross-section, and has an open bottom and open opposite ends, and the battery terminal 102 and part of the distal end portion of the wire 103 can be fitted into this cover body through the bottom opening thereof. The front end portion of the cover body 101a is slightly increased in width to provide an annular holding portion 108 for receiving the fastening ring 105 of the battery terminal 102. An inner surface of the annular holding portion 108 is so formed as to be disposed in substantially intimate contact with the outer peripheral surface of the fastening ring 105. The width of a rear portion of the cover body 101a, extending rearwardly from the annular holding portion 108, is generally equal to the width of the wire connection portion 102a.

The cover piece portion 101b is connected to the cover body 101a through the hinge portion 107 so as to be opened and closed relative to the cover body 101a. A step 109 is formed on an upper surface of the cover body 101a such that a rear portion of this upper surface is higher than a front portion thereof. The hinge 107 is provided at that portion of the higher rear portion of this upper surface, disposed near to the step 109, and extends in the direction of the width of the cover body.

In the above construction, for opening the cover piece portion 101b, an operating piece portion 112, formed integrally at the front end of the cover piece portion 101b, is lifted. For closing the cover piece portion 101b, the cover piece portion 101b is pressed down, so that claws 110a of retaining arms 110, formed within the cover piece portion 101b, are brought into engagement respectively with retaining reception portions 11 formed in the cover body portion 101a.

However, the above conventional protecting cover has the following problems which should be solved.

Although the closed condition of the openable/closable cover piece portion 101b is maintained by the lock means comprising the retaining arms 110 and the retaining reception portions 111, there is encountered a problem that the open condition of the cover piece portion 101b can not be maintained since any lock means for this purpose is not provided at the cover piece portion 101b and the cover body portion 101a.

Namely, when the battery terminal 102 (to be connected to the battery post) or various connection terminals (to be connected to the battery post through a fuse unit) are to be attached and detached, and when fuses, provided within the fuse unit, are to be exchanged with new ones, these operations need to be carried out while holding the cover piece portion 101b in the open condition. However, the cover piece portion 101b to be opened is connected to the cover body 101a through the elastic hinge portion 107, and this cover piece portion is opened while elastically deforming the hinge portion 107 of an arcuate cross-section in a direction of reverse warping of this hinge portion. Therefore, the cover piece portion 101b tends to be elastically returned into its closed condition, and therefore the operator must effect the operation while holding the cover piece portion 101b with one hand. In this case, the operator must tighten and loosen the fastening bolt 106 with the other (empty) hand, and therefore there has been encountered a problem that the efficiency of the attaching/detaching operation and other operations is low

SUMMARY OF THE INVENTION

With the above problems in view, it is an object of this invention to provide a battery connecting portion-protecting cover in which the protecting cover can be held in an open condition so as to enhance the efficiency of an operation, such as an operation for attaching and detaching a battery terminal, various connection terminals or others, and a fuse-exchanging operation, and a hinge portion exhibits high durability against repeated bending.

The above object has been achieved by a battery connecting portion-protecting cover of the invention comprising a cover body portion for covering a battery terminal, connected directly to a battery post, or a fuse unit, and a cover opening/closing portion which is connected to the cover body portion through a hinge portion, and can be pivotally opened and closed about the hinge portion; characterized in that an insertion piece portion is formed on that portion of the cover opening/closing portion disposed near to the hinge portion, and has a retaining portion formed at a distal end thereof; and the cover body portion has an insertion hole portion into which the insertion piece portion can be fittingly inserted.

In this construction, the insertion piece portion for locking purposes is formed on the cover opening/closing portion, and the insertion hole portion for the insertion piece portion is formed in the cover body portion. When the cover opening/closing portion is lifted, and is pivotally moved through about 90 degrees about the hinge portion, the insertion piece portion of the cover opening/closing portion is inserted into the insertion hole portion in the cover body portion, and at a predetermined opening angle of the cover opening/closing portion, the retaining portion on the cover opening/closing portion is retained by the insertion hole portion, so that the cover opening/closing portion is held in an open condition. Namely, when the cover opening/closing portion is pivotally moved in the opening direction, the insertion piece portion is gradually inserted deep into the insertion hole portion, and the cover opening/closing portion is brought into abutting engagement with the cover body portion, so that the pivotal movement of the cover opening/closing portion is stopped. Then, when leaving hold of the cover opening/closing portion, the cover opening/closing portion is slightly restored, so that the retaining portion is retained by the insertion hole portion, thereby holding the opening/closing portion in the open condition. For closing the cover opening/closing portion, the retaining of the insertion piece portion by the insertion hole portion is canceled, and the cover opening/closing portion is pivotally moved in the closing direction, and this cover opening/closing portion is fixed to the fuse unit by lock means.

In the battery connecting portion-protecting cover, the cover opening/closing portion and the cover body portion include slanting walls, respectively, which are opposed to each other, with the hinge portion disposed therebetween, and the insertion piece portion is formed on the slanting wall of the cover opening/closing portion, and the insertion hole portion is formed in the slanting wall of the cover body portion.

In this construction, the insertion piece portion is formed on the slanting wall of the cover opening/closing portion, and the insertion hole portion is formed in the slanting wall of the cover body portion, and therefore the insertion piece portion can be provided without projecting outwardly from the cover opening/closing portion, and the cover opening/closing portion is prevented from interfering with those parts around the battery post, and besides can be held in the open condition. The slanting walls, opposed to each other, with the hinge portion disposed therebetween, are abutted against each other, so that the pivotal movement of the cover opening/closing portion in the opening direction is stopped, and therefore the angle of opening of the cover opening/closing portion can be limited by the slating angle of the slanting walls.

In the battery connecting portion-protecting cover, the pair of insertion piece portions are provided near to opposite end portions of the hinge portion, respectively.

In this construction, the pair of insertion piece portions are provided, and therefore the cover opening/closing portion, while supported at two points, is held in the open condition, and therefore when an accidental external force acts on the cover opening/closing portion, the external force, acting on each insertion piece portion, is reduced, and the insertion piece portions are prevented from being deformed or bent, and hence the retained condition will not be canceled.

In the battery connecting portion-protecting cover, the retaining portions of the pair of insertion piece portions project inwardly toward each other or outwardly away from each other.

In this construction, the retaining portions of the pair of insertion piece portions project inwardly toward each other or outwardly away from each other, and therefore lateral forces, acting respectively on inner surfaces of the insertion hole portions when the pair of insertion piece portions are inserted respectively into the insertion hole portions, with the retaining portions held in contact respectively with these inner surfaces, are directed in the same direction, so that these lateral forces cancel each other, and a shearing force is prevented from acting on the opposite end portions of the hinge portion.

In the battery connecting portion-protecting cover, the insertion piece portion is a rib-like, elastically-deformable projected wall.

In this construction, the projected wall is elastically deformable, and therefore even if the projected wall and the insertion hole portion are out of registry with each other because of a molding error, deformation and so on of the cover opening/closing portion and cover body portion, such misregistration is allowed, and the protected wall can be smoothly inserted into the insertion hole portion. And besides, the protected wall has a rib-like shape, and therefore has the increased rigidity, and is prevented from elastic deformation upon application of an external force.

BRIEF DESCRIPTION OF PREFERRED EMBODIMENTS

DETAILED DESCRIPTION OF THE PREFERRED EMBODIMENTS

A preferred embodiment of the present invention will now be described in detail with reference to the drawings.

Figure 1:
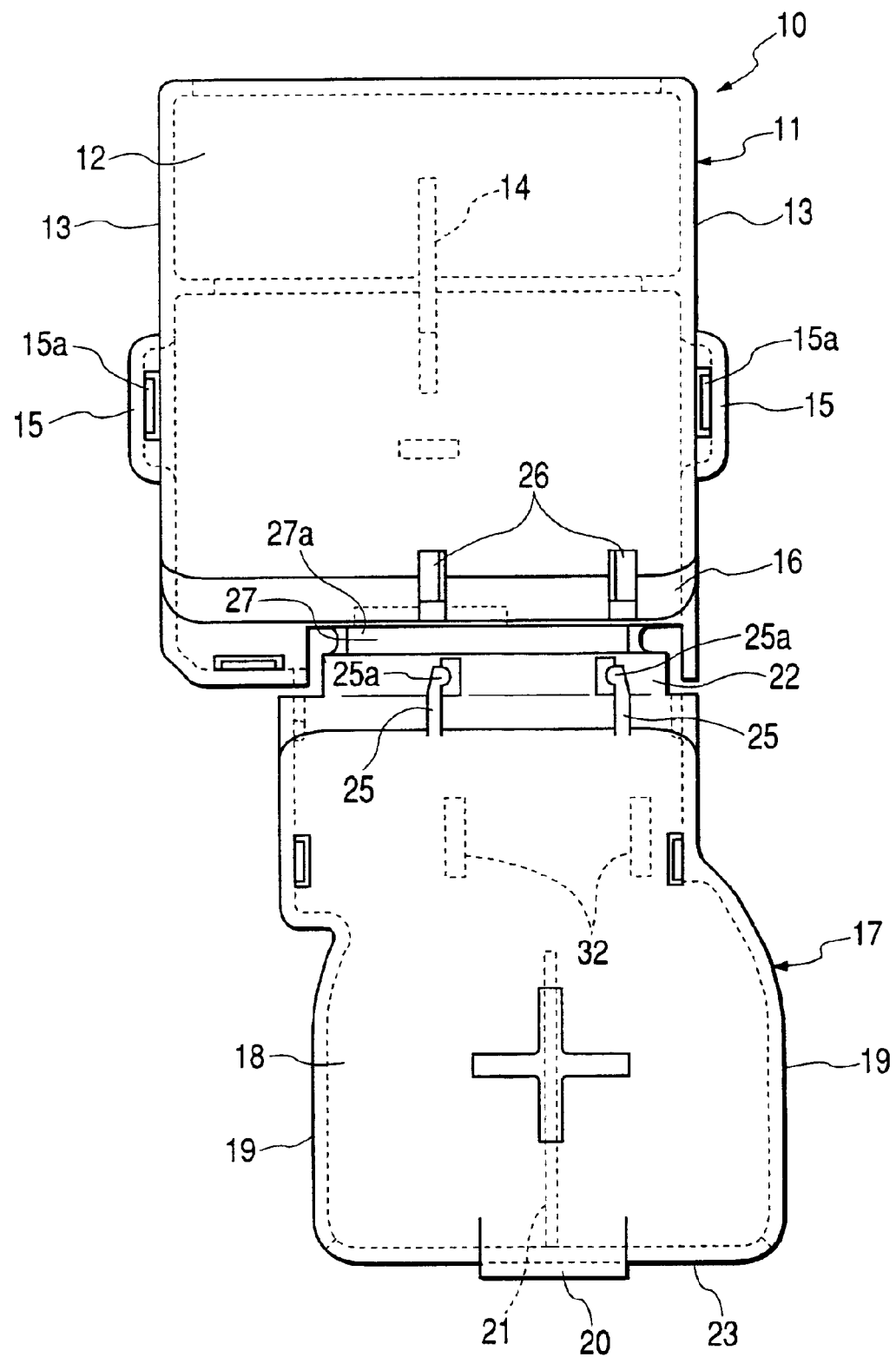
FIG. 1 is a plan view showing one preferred embodiment of a battery connecting portion-protecting cover of the present invention.
Figure 2:
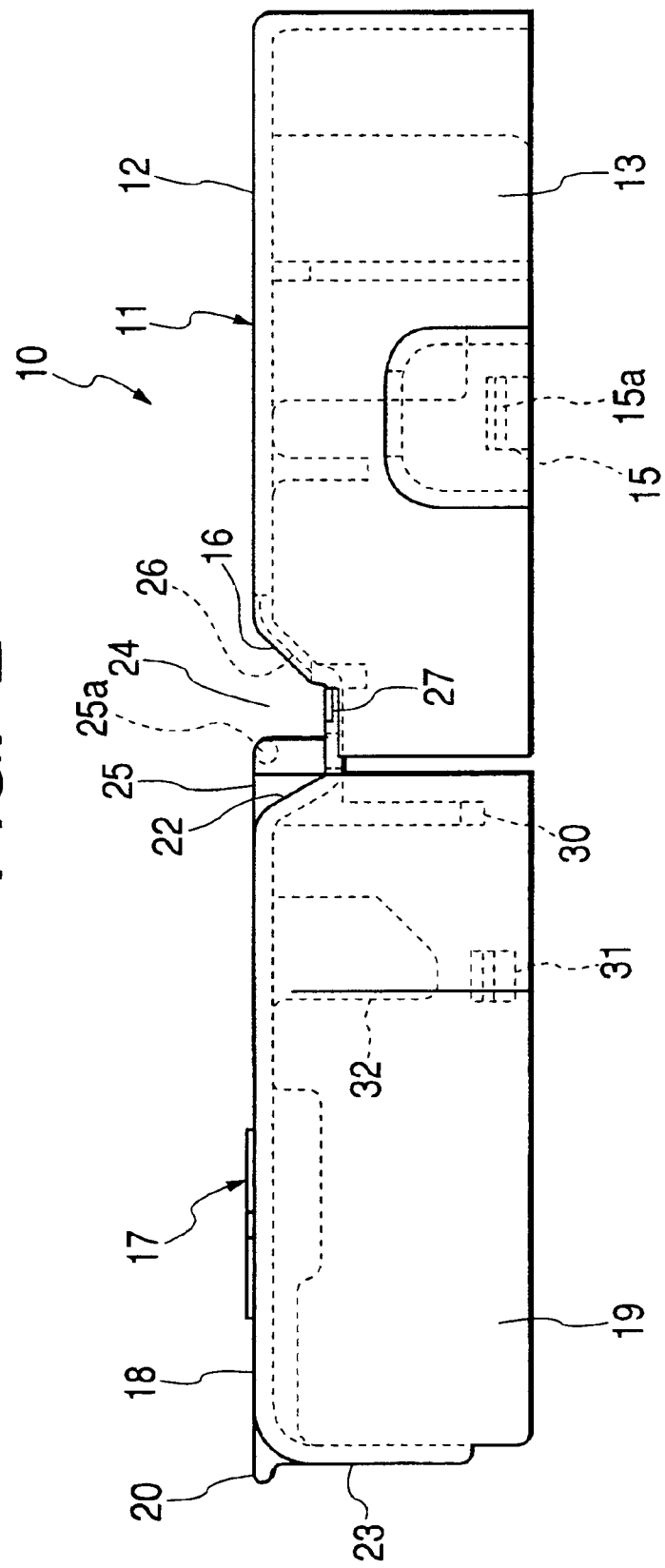
FIG. 2 is a side-elevational view of the battery connecting portion-protecting cover of FIG. 1.
Figure 3:
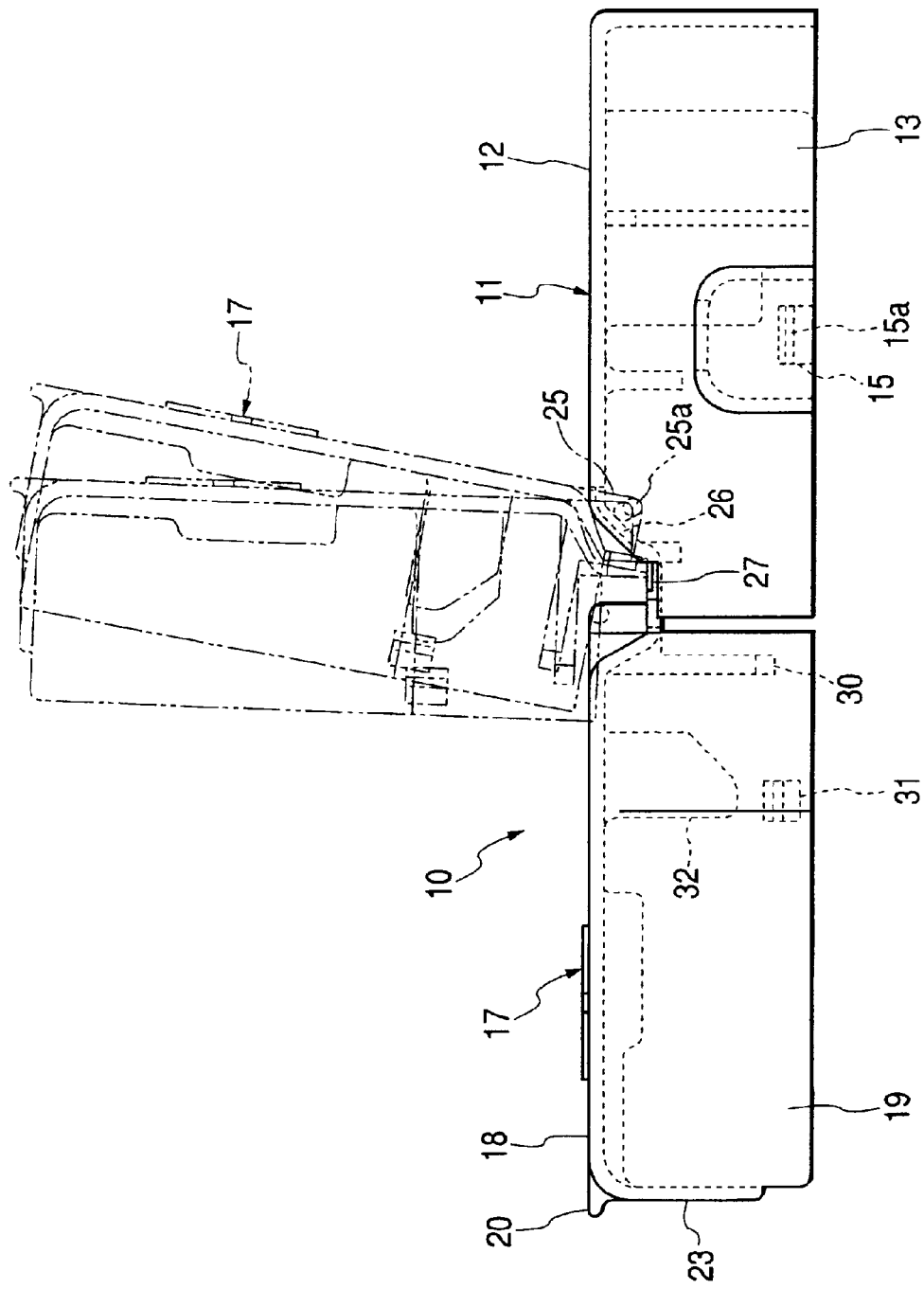
FIG. 3 is a side-elevational view showing open and closed conditions of the battery connecting portion-protecting cover of FIG. 2.

FIGS. 1 to 3 shows one preferred embodiment of a battery connecting portion-protecting cover of the present invention used for a fuse unit.

As shown in FIG. 1, the protecting cover 10 includes a cover body portion 11 for covering an upper side of the fuse unit 52 (see FIG. 7), adapted to be connected to a battery post (not shown), and a cover opening/closing portion 17 connected to the cover body portion 11 through a hinge portion 27. The fuse unit 52, which will be hereinafter more fully described, includes a fuse element 53, having a plurality of fuses (not shown), and a resin body 54 containing the fuse element 53.

The protecting cover 10 is made of a heat-resistant resin material such as vinyl chloride or other plastics material, and has a generally box-shape with an open bottom so that it can cover the fuse unit 52 from the upper side.

The cover body portion 11 is a lid portion for covering a rear half portion of the fuse unit 52, having terminal connection portions (not shown), the fuses and so on, from the upper side, and is fixed to the fuse unit 52 by lock means. The cover opening/closing portion 17 is a lid portion for covering a front half portion of the fuse unit 52, connected to the battery post, and is openable and closable.

The cover body portion 11 includes an upper wall 12 of a rectangular shape, opposite side walls 13, disposed at an angle of about 90 degrees with respect to the upper wall 12, a partition portion 14, formed on and extending downwardly from a central portion of the upper wall 12, and lock portions 15 provided at generally middle portions of the side walls 13, respectively. A rear side of this cover body portion is open so that terminals (not shown), connected to wires, can pass through this rear opening, and a lower side thereof is open so that the cover body portion can generally embrace the rear half portion of the fuse unit 52. A slanting wall 16, disposed at the front end of the cover body portion remote from the rear wall, is connected to the cover opening/closing portion 17 through the hinge portion 27. Here, for description purposes, with respect to the front and rear, that side, disposed at the battery post, is the front side whereas that side, to which the wire-connected terminals are connected, is the rear side. With respect to the right and left, the right-left direction is the direction of the width perpendicular to the front-rear direction. The direction of the height is the direction of the depth of the protecting cover 10.

The partition portion 14 divides an internal space of the cover body portion 11 into two sections, and serves to protect the terminal connection portions, formed respectively at two (right and left) sections of the fuse unit 52, in an insulated manner. The lock portions 15 serve to releasably fix the cover body portion 11 to the fuse unit 52. In this embodiment, lock means, comprising a projection 15a and a recess portion 58 (see FIG. 7), is used as the lock portion 15 although various kinds of lock means can be used as the lock portion 15.

As described above, the cover opening/closing portion 17 is connected to the cover body portion 11 through the hinge portion 27, and can be pivotally opened and closed about the hinge portion 27 serving as the axis of pivotal movement. The cover opening/closing portion 17 is similar in construction to the cover body portion 11, and has a generally box-shape with an open bottom. This cover opening/closing portion includes an upper wall 18, having a "plus" mark (meaning the positive electrode of the battery post) formed on a central portion thereof, opposite side walls 19, downwardly extending substantially perpendicularly from the upper wall 18, a front wall 23, having a flange portion 20 for the opening and closing operation, and a slanting wall 22 disposed remote from the front wall 23, that is, immediately adjacent to the hinge portion 27. A partition portion 21 is formed on a widthwise central portion of the upper wall 18.

The upper wall 18 is formed into a crank-like shape since the fuse unit 52 has a crank-like shape The side walls 19 have the same height as that of the side walls 13 of the cover body portion 11. The partition portion 21 is disposed generally centrally of the width (in the right-left direction), and projects downwardly. This partition portion 21 has such a height that it can abut against the upper surface of the fuse unit 52 when the cover opening/closing portion 17 is closed.

The flange portion 20 extends forwardly from the upper wall 18. After the locked condition of the cover opening/closing portion 17 is canceled, the finger is engaged with the flange portion 20, and then this flange portion is lifted, and by doing so, the cover opening/closing portion 17 can be easily opened and closed. The locked condition of the covering opening/closing portion 17 can be easily canceled by opening or forcing the two side walls 19 away from each other.

The slanting wall 22 of the cover opening/closing portion 17 is disposed in opposed relation to the slanting wall 16 of the cover body portion 11. The two slanting walls 16 and 22 and the hinge portion 27 jointly form an opening/closing space 24 (see FIG. 2) of a generally V-shape extending over the entire width of the protecting cover 11. Because of the provision of the opening/closing space 24, the cover opening/closing portion 17 can be smoothly opened and closed without interference with the cover body portion 11.

The opposed slanting walls 16 and 22 are disposed at a predetermined slanting angle such that the cover opening/closing portion 17 can be wide opened so as not to hinder the attachment and detachment of the wire-connected terminals and the visual inspection and exchange of the fuses.

The hinge portion 27 is disposed between the cover body portion 11 and the cover opening/closing portion 17, and cooperates with these portions to form the protecting cover 10 of an integral construction. The hinge portion 17 is disposed at a level lower than the upper walls 12 and 18 of the cover body portion 11 and cover opening/closing portion 17. This arrangement is adopted in order to increase the radius of curvature of a path of opening/closing movement of the cover opening/closing portion 17 to thereby reduce the amount of forward projection of this opening/closing movement path.

This construction is suited for use with an European battery (not shown) in which an upper surface of the battery (51) is not flat, but a bulged portion is formed on this upper surface. With this construction, advantageously, the interference of the cover opening/closing portion 17 with the bulged portion is prevented, and besides the surroundings of the battery post are protected in an insulated manner, and the intrusion of waterdrops and the like is prevented.

The hinge portion 27 is smaller in thickness than the upper walls 12 and 18 of the cover body portion 11 and cover opening/closing portion 17, and is smaller in width than the cover opening/closing portion 17. With this construction, the cover opening/closing portion 17 can be smoothly opened and closed. Incidentally, in the case where the hinge portion 27 is formed or curled into a generally annular shape, a force, acting on the hinge portion 27 during the opening and closing operation, can be distributed over the whole of the hinge portion, so that fatigue and aged damage can be effectively prevented.

A pair of projected walls (insertion piece portions) 25 for insertion respectively into insertion hole portions 26 in the cover body portion 11 are formed on the slanting wall 22 of the cover opening/closing portion 17. An arcuate hook portion (retaining portion) 25a is formed at a distal end of each of the projected walls 25. Therefore, the projected wall 25 has the shape of "an arm with a hook" as a whole, and can be retainingly engaged in the insertion hole portion 26.

Each projected wall 25 is formed into a rib-like shape, and extend toward the hinge portion 27 in parallel relation to the side walls 19 of the cover opening/closing portion 17, the projected wall 25 extending also in the direction of the height. The projected wall is thin in the direction of the width so as to be elastically deformed, and has such a width as to be inserted into the insertion hole portion 26. The projected walls 25 are disposed within the opening/closing space 24, and hence do not project upwardly beyond the upper surface of the cover opening/closing portion 17. Therefore, in the closed condition of the cover opening/closing portion 17, these projected walls will not project outwardly from this cover opening/closing portion 17, and are prevented from interfering with other parts around the battery post.

Figure 5:
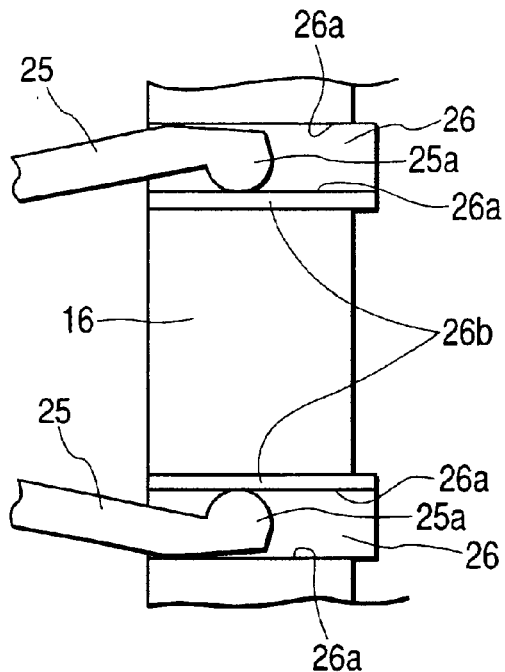
FIG. 5 is a view showing a condition in which the insertion piece portions of a cover opening/closing portion inserted respectively in the insertion hole portions in a cover body portion.
Figure 6:
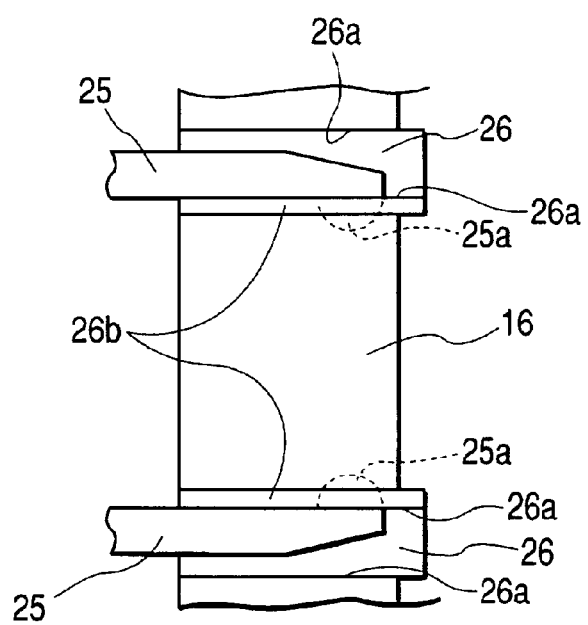
FIG. 6 is a view showing a condition in which the insertion piece portions of the cover opening/closing portion are retained respectively by the insertion hole portions in the cover body portion.

As shown in FIGS. 5 and 6, the hook portions 25a, formed respectively at the distal ends of the pair of projected walls 25, project inwardly toward each other, and each hook portion 25a slidingly inserted into the insertion hole portion 26 in sliding contact with an inner surface 26a of the insertion hole portion 26 while it is elastically displaced outwardly, and when the hook portion 25a completely passes through the inner surface 26a, the hook portion 25a is elastically restored inwardly to be retained by an edge portion of the inner surface. Each insertion hole portion 26 is a through hole, and a slanting surface 26b for smoothly guiding the hook portion 25a is formed at an inlet portion of the insertion hole portion 26.

In this embodiment, although the arcuate hook portions 25a are directed inwardly to face each other, they may be directed outwardly to face away from each other. The hook portions 25a are directed inwardly toward each other or outwardly away from each other, and with this construction, lateral forces, acting respectively on the inner surfaces 26a of the insertion hole portions 26 when the pair of projected walls 25 are inserted respectively into the insertion hole portions 26, are directed away from each other, so that these lateral forces cancel each other, and a shearing force, acting on the hinge portion 27 in the direction of the length thereof, can be ignored or reduced. As a result, each time the cover opening/closing portion 17 is opened and closed, a repeated shearing force will not act on the hinge portion 27, thereby preventing damage to the hinge portion 27.

The amount of projecting of each hook portion 25a corresponds to the amount of retaining engagement of the hook portion 25a with the insertion hole portion 26, and the retaining can be effected positively so that the cover opening/closing portion 17 can be held in the open condition. And besides, the hook portion 25a is formed into an arcuate shape, and therefore can be inserted smoothly into the insertion hole portion 26 in sliding contact therewith, and when canceling the retained condition, the hook portion can be smoothly withdrawn without being caught by the insertion hole portion.

The pair of projected walls 25 are provided in a well-balanced manner near to opposite ends 27a of the hinge portion 27, respectively. If there is provided only one projected wall 25, there are possibilities that the cover opening/closing portion 17 is opened in an inclined manner and that when the projected wall 25 is inserted into the insertion hole portion 26, a shearing force acts on the hinge portion 27 to damage the same.

As shown in FIG. 2, guide ribs 30, corresponding respectively to guide grooves 59 (see FIG. 7) in the fuse unit, as well as lock projections 31 corresponding respectively to recess portions 58 of the fuse unit 52, are formed respectively on the inner surfaces of the side walls 19 of the cover opening/closing portion 17. Positioning ribs 32 for abutment against the upper surface of the fuse unit 52 are formed on and project from the inner surface of the upper wall 18 of the cover opening/closing portion 17.

Each guide rib 30 is a rib-like projection extending in the upward-downward direction, and is disposed at a rear portion of the side wall 19 near to the hinge portion 27. Each guide rib 30 can be slidingly guided by a guide surface 59a of the corresponding guide groove 59 in the fuse unit, and therefore the cover opening/closing portion 17 can be smoothly opened and closed without being shaken.

Each lock projection 31 is formed on and projects from the inner surface of the side wall 19 at a lower portion thereof. The guide ribs 30 are disposed near to the hinge portion 27 whereas the lock projections 31 are disposed remote from the hinge portion 27. With this arrangement, the locking of the cover opening-closing portion 17 can be effected after the positioning thereof is effected, and at this time, the opening and closing operations for this cover opening-closing portion 17 will not be hindered.

The positioning ribs 32 are formed on and project downwardly from the inner surface of the upper wall 18, and are parallel spaced in the direction of the width. The positioning ribs 32 can abut against the terminal connection portions, exposed from a cavity chamber portion (not shown) of the resin body 54, to effect the positioning of the cover opening/closing portion in the direction of the height. The cover opening/closing portion 17 can be positively fixed to the fuse unit 52 in such a manner that the positioning ribs 32 cooperate with the lock projections 31 to grip the fuse unit 52.

FIG. 3 shows the open condition of the cover opening/closing portion 17. For opening the cover opening/closing portion 17, this cover opening/closing portion 17 is lifted, and is pivotally moved through an angle of about 90 degrees about the hinge portion 27, serving as the axis of pivotal movement. At this time, the projected walls 25 of the cover opening/closing portion 27 are gradually inserted deep respectively into the insertion hole portions 26 in the cover body portion 11, and the cover opening/closing portion 17 is brought into abutting engagement with the cover body portion 11, so that the pivotal movement of the cover opening/closing portion 17 is stopped, and at the same time the hook portions 25a on the cover opening/closing portion 17 are retained by the insertion hole portions 26, respectively, so that the cover opening/closing portion 17 is held in the open condition.

Figure 4:
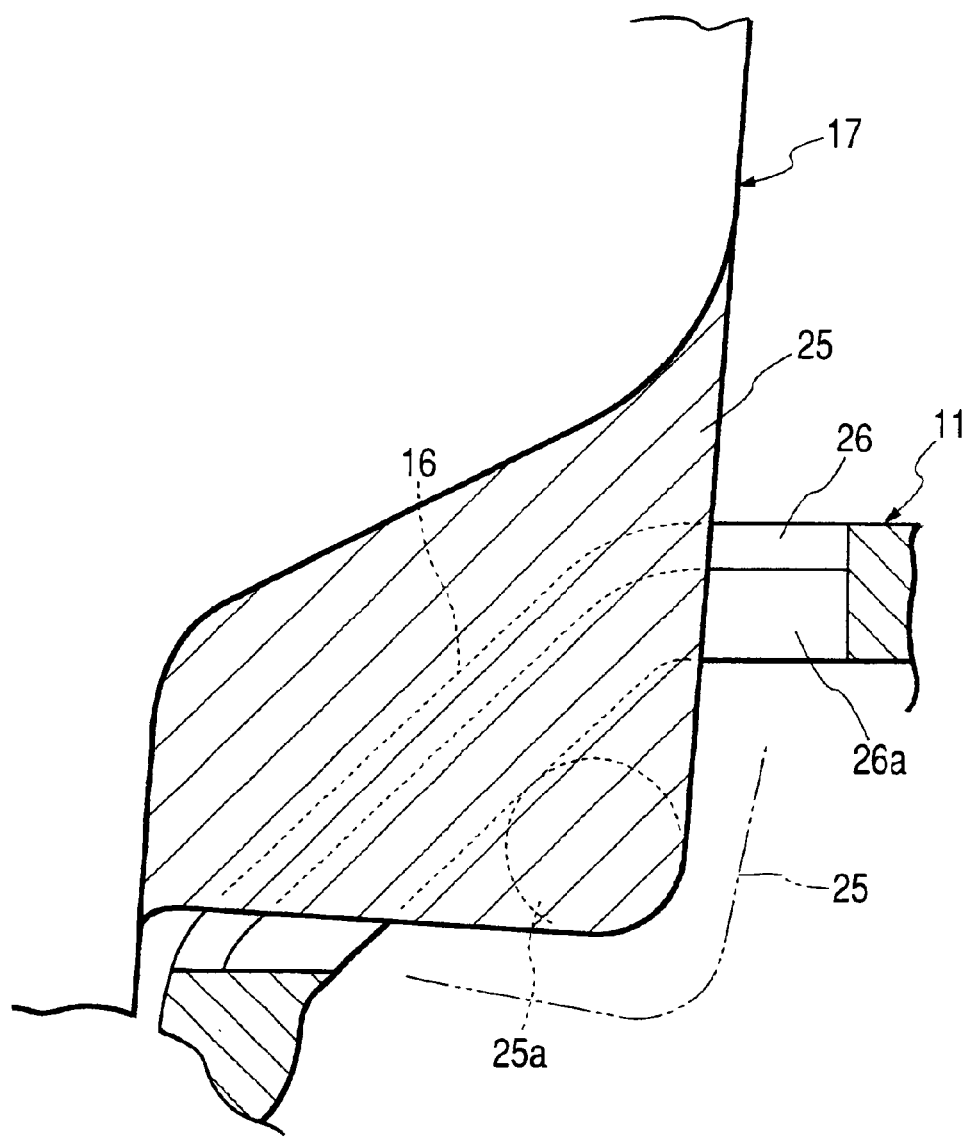
FIG. 4 is a cross-sectional view showing a condition in which a retaining portion of an insertion piece portion is retained by an insertion hole portion.

When each hook portion 25a is to be retained by the corresponding insertion hole portion 26, the projected wall 25, inserted in the insertion hole portion 26, is slightly restored, so that the hook portion 25a is engaged with the insertion hole portion 26, and therefore is retained by this insertion hole portion, as shown in FIG. 4.

For closing the cover opening/closing portion 17, first, the projected walls 25 are forced or elastically deformed outwardly away from each other, thereby canceling the retained condition, and then this cover opening/closing portion is pivotally moved in the closing direction about the hinge portion 27 serving as the axis of pivotal movement. As a result, each of the guide ribs 30 is inserted into the corresponding guide groove 59 in the fuse unit 52, and is brought into abutting engagement with a groove wall or surface of this guide groove 59, so that each lock projection 31 is engaged in the recess 58 in the fuse unit 52, thereby fixing the cover opening/closing portion 17 to the fuse unit 52.

Figure 7:
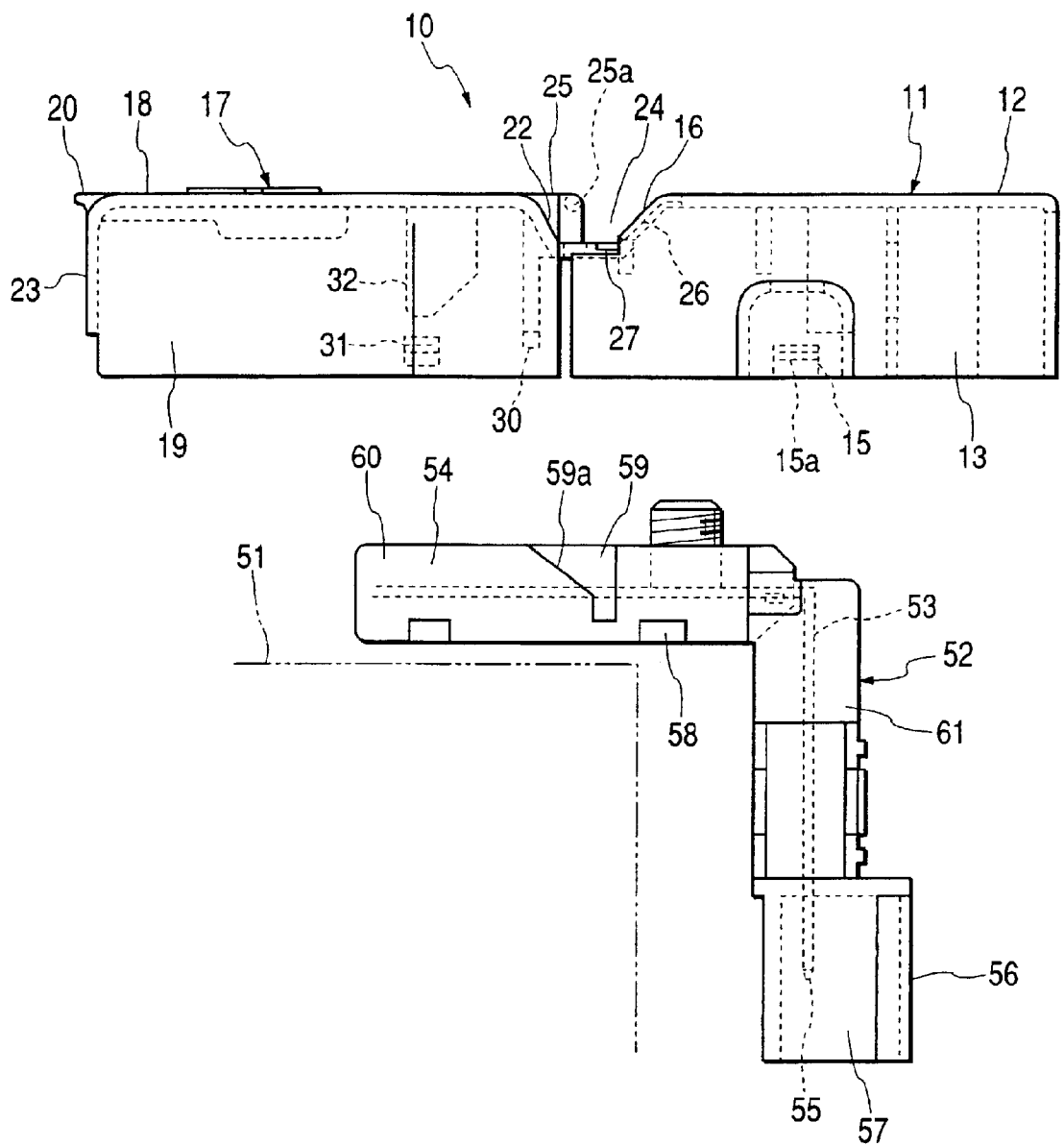
FIG. 7 is a view showing a condition in which the battery connecting portion-protecting cover is to be mounted on a fuse unit.
Figure 8:
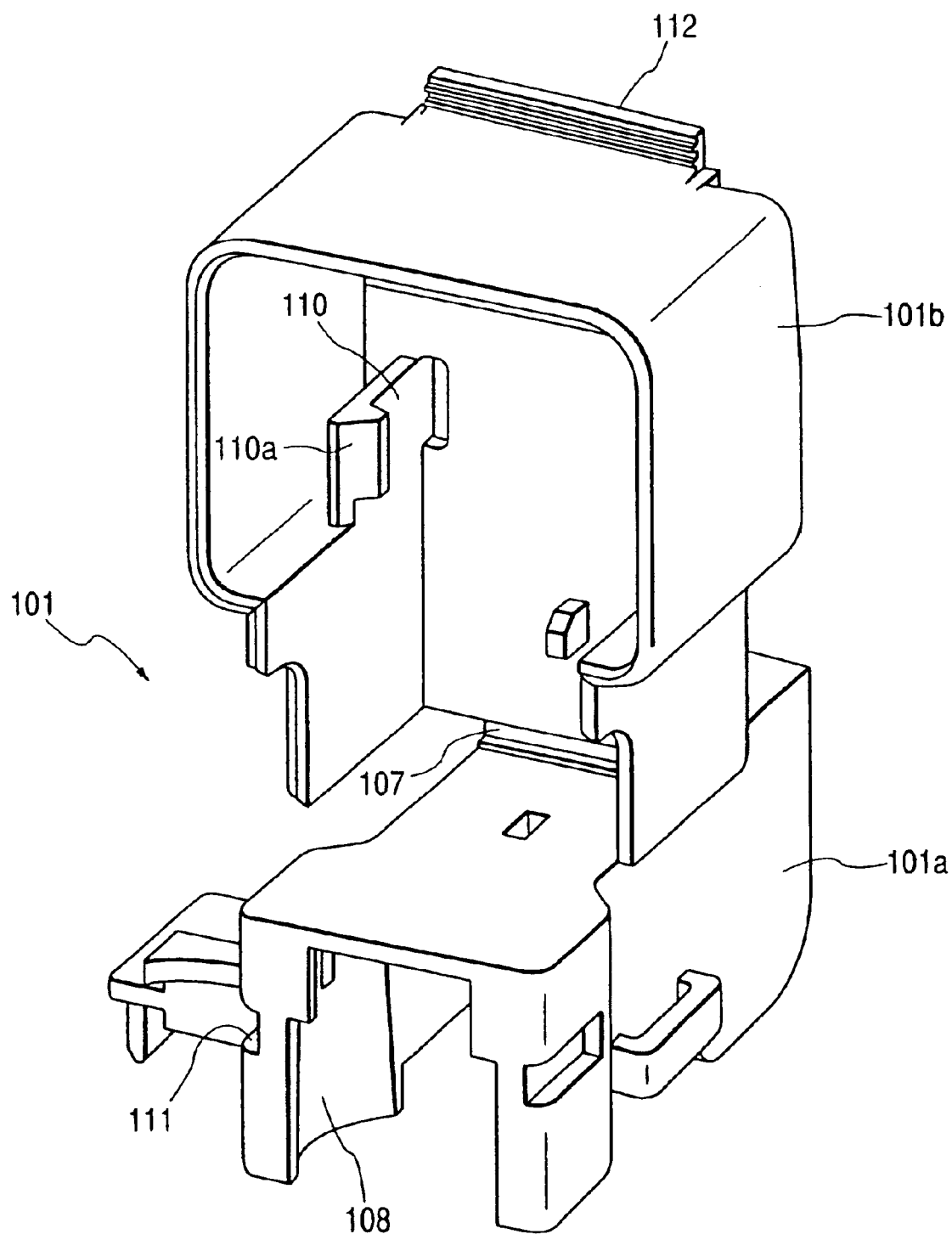
FIG. 8 is a perspective view showing one conventional battery connecting portion-protecting cover.
Figure 9:
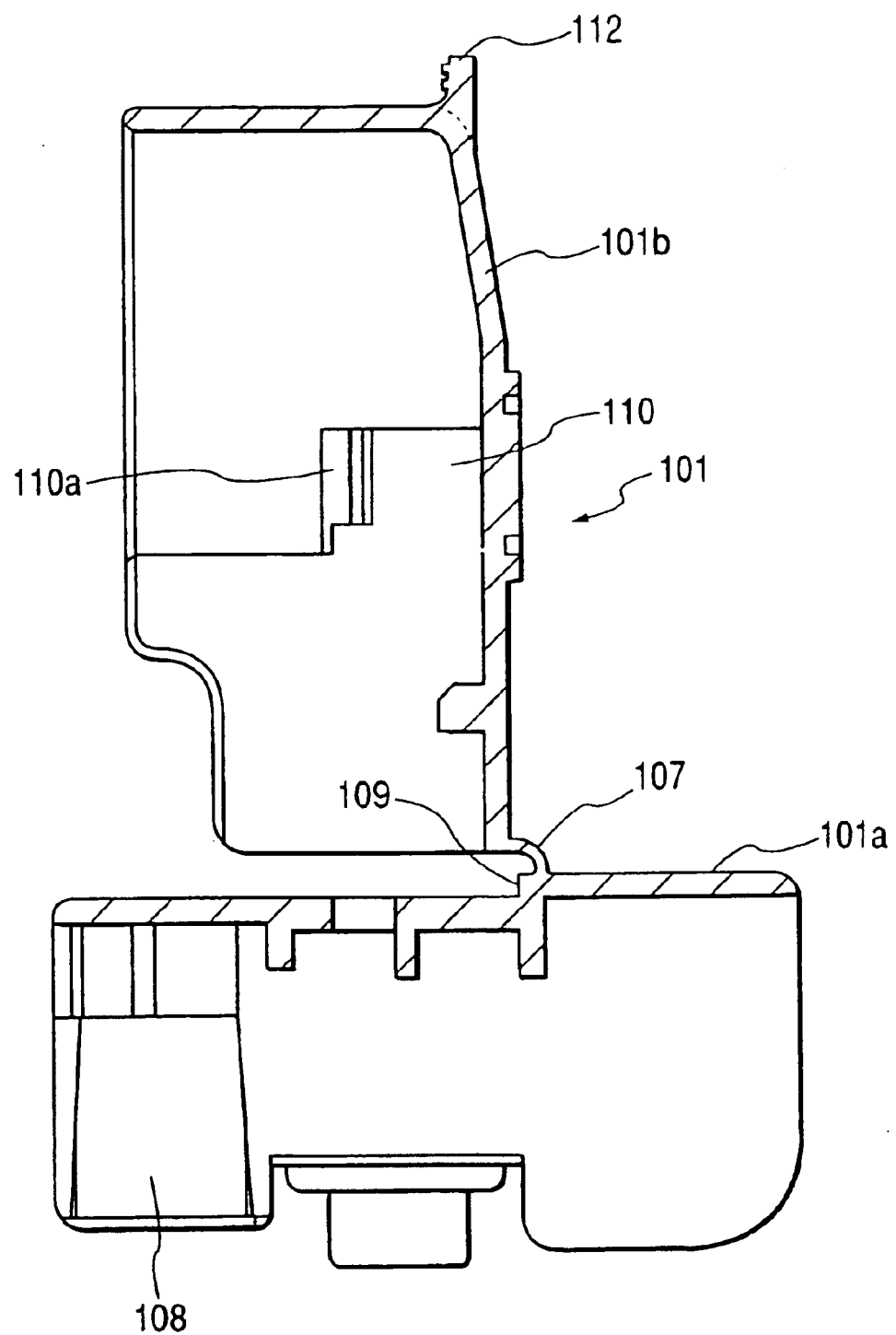
FIG. 9 is a cross-sectional view of the battery connecting portion-protecting cover in its open condition.
Figure 10:
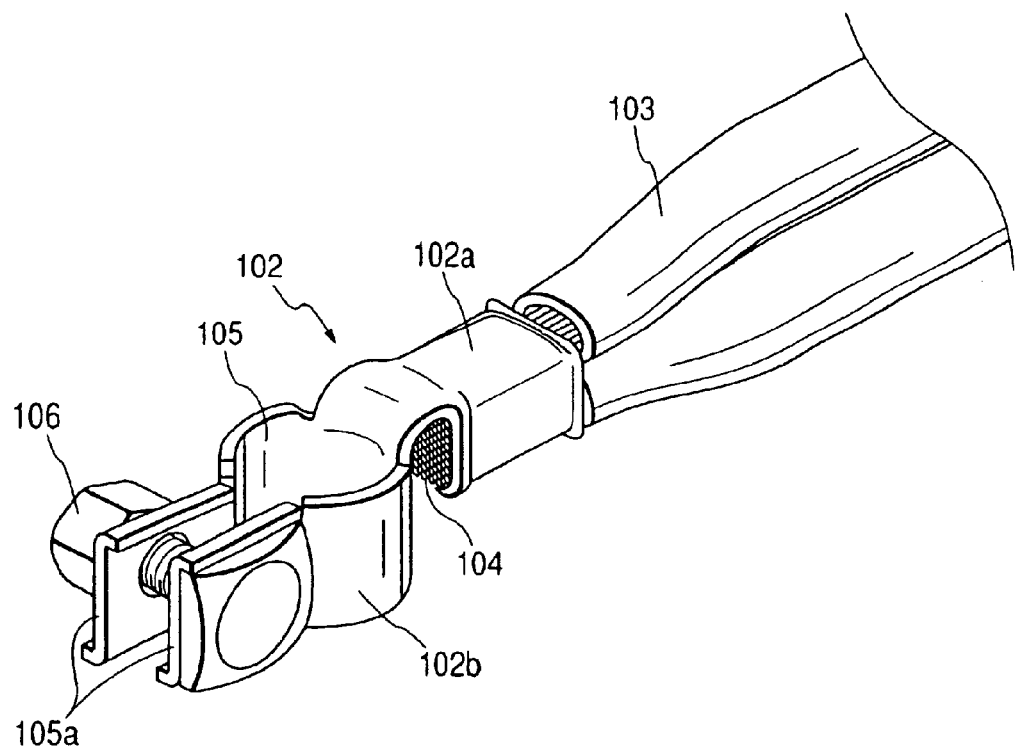
FIG. 10 is a perspective view showing a battery terminal for which the battery connecting portion-protecting cover is used.

Next, the fuse unit 52 will be described with reference to FIG. 7. FIG. 7 shows a condition in which the fuse unit 52 is bent, and is mounted on the battery 51 for a vehicle.

The fuse unit 52 connects the battery 51 to power supply wires (not shown), and comprises the plate-like fuse element 53 of electrically-conductive metal, having the fuses, and the insulative resin body 54 in which the fuse element 53 is insert molded. Although the illustrated fuse unit 52 is bent at an angle of about 90 degrees at a middle portion thereof, it is molded into a linearly-extended configuration when producing this fuse unit by molding. By thus molding this fuse unit, there is achieved an advantage that a molded product-removing step and other steps can be carried out easily.

The fuse element 53 is blanked from a single electrically-conductive sheet, and has a flexible portion (not shown) formed integrally at a middle portion thereof, and this fuse element can be bent at the flexible portion in a direction of the thickness of the sheet. If the flexible portion has the same thickness as that of the fuse element 53, this flexible portion can be bent satisfactorily. The flexible portion is disposed at a portion of a resin-molding mold (not shown) at which a resin material is not filled, and therefore the flexible portion is exposed to an outer surface of the resin body 54.

A plurality of parallel tab terminals 55 are provided at an end of a vertically-disposed portion of the electrically-conductive sheet extending from the flexible portion. The tab terminals 55 extend respectively to the fuses exposed from the resin body 54. The tab terminals 55 project into a connector fitting camber 57 in a connector housing 56 formed integrally with the resin body 54. The tab terminals 55 and the connector housing 56 jointly form a female connector. The terminal connection portions for the various wire-connected terminals (not shown) are formed at a horizontally-disposed portion of the electrically-conductive sheet.

The resin body 54 is divided at a middle portion thereof into front and rear portions. The horizontally-disposed division portion 60 is fastened and connected to a battery terminal (not shown) in the upward-downward direction by a nut, and is fastened and connected to the battery post, using an annular portion of the battery terminal. The vertically-disposed division portion 61 is disposed at an angle of about 90 degrees with respect to the horizontally-disposed division portion, and extends downwardly along a side surface of the battery 51.

As described above, in the present invention, the insertion piece portion, having the retaining portion, is formed on the cover opening/closing portion, and the insertion hole portion is formed in the cover body portion. Therefore, the insertion piece portion is gradually inserted deep into the insertion hole portion, and the retaining portion, formed at the distal end of the insertion piece portion, completely passes through the insertion hole portion, and then is slightly returned, and at this position, the retaining portion is retained by the insertion hole portion, thereby holding the opening/closing portion in the open condition. Thus, the protecting cover is held in the open condition by the retaining of the retaining portion of the insertion piece portion by the insertion hole portion, and the efficiency of the operation, such as an operation for attaching/detaching the battery terminal, various connection terminals and others, and a fuse-exchanging operation, can be enhanced.

In the present invention, the insertion piece portion and the insertion hole portion are provided respectively at the two slanting walls which are opposed to each other with the hinge portion disposed therebetween. Therefore, the insertion piece portion can be provided without projecting outwardly from the cover opening/closing portion, and the cover opening/closing portion is prevented from interfering with those parts around the battery post, and besides can be held in the open condition.

In the present invention, the pair of insertion piece portions are provided, and therefore the cover opening/closing portion, while supported at two points, is held in the open condition in a well-balanced manner, and therefore when an accidental external force acts on the cover opening/closing portion, the insertion piece portions are prevented from being deformed. Thus, the insertion piece portions are prevented from being deformed or bent, and the cover opening/closing portion can be positively held in the open condition.

In the present invention, the retaining portions of the insertion piece portions project inwardly toward each other or outwardly away from each other, and therefore lateral forces, produced when the insertion piece portions are inserted respectively into the insertion hole portions, with the retaining portions held in contact respectively with the inner surfaces of these insertion hole portions, cancel each other, and a shearing force is prevented from acting on the opposite end portions of the hinge portion. Therefore, the hinge portion will not be cut or damaged, and the durability of the hinge portion against repeated bending can be enhanced.

In the present invention, the projected wall is elastically-deformable, and has a rib-like shape, and therefore the projected wall has the increased rigidity. And besides, even if the projected wall and the insertion hole portion are out of registry with each other, such misregistration is allowed, and the protected wall can be smoothly inserted into the insertion hole portion. Therefore, in addition to the effect of claim 1, the reliability of retaining of the cover opening/closing portion can be enhanced.

What is claimed is:

1. A battery connecting portion-protecting cover comprising:
    a cover body portion shaped to cover a battery terminal, and be connected directly to one of a battery post and a fuse unit;
    a cover opening/closing portion which is connected to said cover body portion through a hinge portion, and can be pivotally opened and closed about said hinge portion; and
    an insertion piece portion formed on a portion of said cover opening/closing portion adjacent to said hinge portion, and having a retaining portion formed at a distal end thereof,
    wherein, said cover body portion comprises an insertion hole portion into which said insertion piece portion can be fittingly inserted when said cover opening/closing portion is pivotally fully opened.

2. A battery connecting portion-protecting cover according to claim 1, wherein said cover opening/closing portion and said cover body portion include slanting walls, respectively, which are opposed to each other, with said hinge portion disposed therebetween, and said insertion piece portion is formed on said slanting wall of said cover opening/closing portion, and said insertion hole portion is formed in said slanting wall of said cover body portion.

3. A battery connecting portion-protecting cover according to claim 1, wherein a pair of said insertion piece portions are provided near to opposite end portions of said hinge portion, respectively.

4. A battery connecting portion-protecting cover according to claim 2, wherein a pair of said insertion piece portions are provided near to opposite end portions of said hinge portion, respectively.

5. A battery connecting portion-protecting cover according to claim 3, wherein said retaining portions of said pair of insertion piece portions project inwardly toward each other or outwardly away from each other.

6. A battery connecting portion-protecting cover according to claim 4, wherein said retaining portions of said pair of insertion piece portions project inwardly toward each other or outwardly away from each other.

7. A battery connecting portion-protecting cover according to claim 1, wherein said insertion piece portion is a rib-shaped, elastically-deformable projected wall.

8. A battery connecting portion-protecting cover according to claim 2, wherein said insertion piece portion is a rib-shaped, elastically-deformable projected wall.

9. A battery connecting portion-protecting cover according to claim 3, wherein said insertion piece portion is a rib-shaped, elastically-deformable projected wall.

10. A battery connecting portion-protecting cover according to claim 4, wherein said insertion piece portion is a rib-shaped, elastically-deformable projected wall.

11. A battery connecting portion-protecting cover according to claim 5, wherein said insertion piece portion is a rib-shaped, elastically-deformable projected wall.

12. A battery connecting portion-protecting cover according to claim 6, wherein said insertion piece portion is a rib-shaped, elastically-deformable projected wall.

13. A battery connecting portion-protecting cover according to claim 1, wherein said cover body portion and said cover opening/closing portion extend laterally adjacently to each other in a generally coplanar manner when said cover opening/closing portion is pivotally closed.

14. A battery connecting portion-protecting cover according to claim 1, wherein said cover body portion and said cover opening/closing portion extend in planes at approximately right angles to each other when said cover opening/closing portion is pivotally opened.

15. A battery connecting portion-protecting cover according to claim 1, wherein said insertion piece portion extends outward from an outer side of said cover opening/closing portion.

16. A battery connecting portion-protecting cover according to claim 1, further comprising another insertion piece portion formed on a portion of said cover opening/closing portion adjacent to said hinge portion, and having another retaining portion formed at a distal end thereof.

17. A battery connecting portion-protecting cover according to claim 16, wherein said retaining portion and said another retaining portion face each other.

18. A battery connecting portion-protecting cover according to claim 16, wherein said retaining portion and said another retaining portion face in opposite directions.

19. A battery connecting portion-protecting cover comprising:
 a cover body portion shaped to cover a battery terminal, and be connected directly to one of a battery post and a fuse unit;
 a cover opening/closing portion which is connected to said cover body portion through a hinge portion, and can be pivotally opened and closed about said hinge portion; and
 an insertion piece portion formed on a portion of said cover opening/closing portion adjacent to said hinge portion, and having a retaining portion formed at a distal end thereof,
 wherein: said cover body portion comprises an insertion hole portion into which said insertion piece portion can be fittingly inserted;
 said cover opening/closing portion and said cover body portion include slanting walls, respectively, which are opposed to each other, with said hinge portion disposed therebetween;
 said insertion piece portion is formed on said slanting wall of said cover opening/closing portion; and
 said insertion hole portion is formed in said slanting wall of said cover body portion.

20. A battery connecting portion-protecting cover according to claim 19, wherein said insertion piece portion is a rib-shaped, elastically-deformable projected wall.

21. A battery connecting portion-protecting cover according to claim 19, wherein a pair of said insertion piece portions are provided near to opposite end portions of said hinge portion, respectively.

22. A battery connecting portion-protecting cover according to claim 21, wherein said insertion piece portion is a rib-shaped, elastically-deformable projected wall.

23. A battery connecting portion-protecting cover according to claim 21, wherein said retaining portions of said pair of insertion piece portions project inwardly toward each other or outwardly away from each other.

24. A battery connecting portion-protecting cover according to claim 23, wherein said insertion piece portion is a rib-shaped, elastically-deformable projected wall.

* * * * *